(12) United States Patent
Mitarai et al.

(10) Patent No.: US 9,740,965 B2
(45) Date of Patent: Aug. 22, 2017

(54) INFORMATION PROCESSING APPARATUS AND CONTROL METHOD THEREOF

(71) Applicant: CANON KABUSHIKI KAISHA, Tokyo (JP)

(72) Inventors: Yusuke Mitarai, Tokyo (JP); Masakazu Matsugu, Yokohama (JP); Hiroto Yoshii, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/961,355

(22) Filed: Dec. 7, 2015

(65) Prior Publication Data
US 2016/0086058 A1    Mar. 24, 2016

Related U.S. Application Data

(62) Division of application No. 13/218,976, filed on Aug. 26, 2011, now Pat. No. 9,245,198.

(30) Foreign Application Priority Data

Sep. 3, 2010  (JP) ................................ 2010-198262

(51) Int. Cl.
*G06K 9/62*  (2006.01)
*G06K 9/66*  (2006.01)
*G06K 9/46*  (2006.01)

(52) U.S. Cl.
CPC ............ *G06K 9/66* (2013.01); *G06K 9/4604* (2013.01); *G06K 9/6202* (2013.01);
(Continued)

(58) Field of Classification Search
CPC .. G06K 9/4604; G06K 9/6202; G06K 9/6203; G06K 9/6215; G06K 9/6255; G06K 9/6267; G06K 9/627

See application file for complete search history.

(56) References Cited

U.S. PATENT DOCUMENTS

| 5,018,218 A | 5/1991 | Peregrim et al. ............... 382/22 |
| 5,715,325 A | 2/1998 | Bang et al. .................... 382/118 |

(Continued)

FOREIGN PATENT DOCUMENTS

| JP | 2005-3676 A | 1/2005 | ............ G01N 33/53 |
| JP | 2007-005818 A | 1/2007 | ............ H01L 21/66 |

(Continued)

OTHER PUBLICATIONS

Japanese Office Action dated Oct. 27, 2014 in corresponding Japanese Patent Application No. 2010-198262.

(Continued)

*Primary Examiner* — Andrew W Johns
(74) *Attorney, Agent, or Firm* — Fitzpatrick, Cella, Harper & Scinto

(57) ABSTRACT

An information processing apparatus comprises: a registration unit adapted to register information required to determine at least one specific pattern in an image; an input unit adapted to input image data; a first generation unit adapted to extract a predetermined feature distribution from the input image data, and to generate a first feature distribution map indicating the feature distribution; a second generation unit adapted to generate a second feature distribution map by applying a conversion required to relax localities of the first feature distribution map to the first feature distribution map; and a determination unit adapted to determine, using sampling data on the second feature distribution map and the registered information, which of the specific patterns the image data matches.

16 Claims, 12 Drawing Sheets

(52) U.S. Cl.
CPC ......... *G06K 9/6255* (2013.01); *G06K 9/6256* (2013.01); *G06K 9/6267* (2013.01); *G06K 9/6282* (2013.01)

(56) References Cited

U.S. PATENT DOCUMENTS

| | | | |
|---|---|---|---|
| 2003/0133613 A1 | 7/2003 | Ono | 382/209 |
| 2005/0152604 A1 | 7/2005 | Kitagawa et al. | 382/209 |
| 2005/0164217 A1 | 7/2005 | Yoshii | 435/6 |
| 2005/0220336 A1 | 10/2005 | Sabe et al. | 382/159 |
| 2005/0280809 A1 | 12/2005 | Hidai et al. | 356/237.3 |
| 2006/0215905 A1 | 9/2006 | Kitamura et al. | 382/159 |

FOREIGN PATENT DOCUMENTS

| | | | | |
|---|---|---|---|---|
| JP | 2008-003800 A | 1/2008 | | G06T 7/60 |
| JP | 2009-025862 A | 2/2009 | | G06T 5/20 |
| JP | 2009-26326 A | 2/2009 | | G06T 7/00 |
| JP | 2009-43184 A | 2/2009 | | G06T 7/00 |
| JP | 2010-117772 A | 5/2010 | | G06T 7/00 |

OTHER PUBLICATIONS

Moore, et al., "Automatic Facial Expression Using Boosted Discriminatory Classifiers", LNCS vol. 4778, pp. 71-83 (2007).

Viola, et al., "Robust Real-Time Face Detection", Int'l. Journal of Computer Vision, vol. 57, No. 2, pp. 137-154 (2004).

Naoyuki Ichimura, "GPU Computing with Orientation Maps for Extracting Local Invariant Features", IPSJ SIG Technical Report, Japan, Information Processing Society of Japan, vol. 2010-CVIM-171 No. 20, pp. 1-8 (Apr. 15, 2010).

Japanese Office Action dated May 19, 2014, concerning Japanese Patent Application No. 2010-198262.

Hong-Chih Liu, et al., "Partial Shape Classification Using Contour Matching in Distance Transformation", IEEE, vol. 12, No. 11, Nov. 1990.

Fisher, et al., "Gaussian Smoothing", http://homepages.inf.ed.ac.uk/rbf/HIPR2/gsmooth.htm (Aug. 2009).

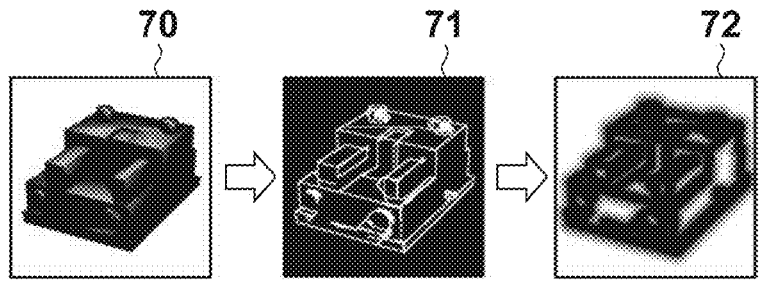
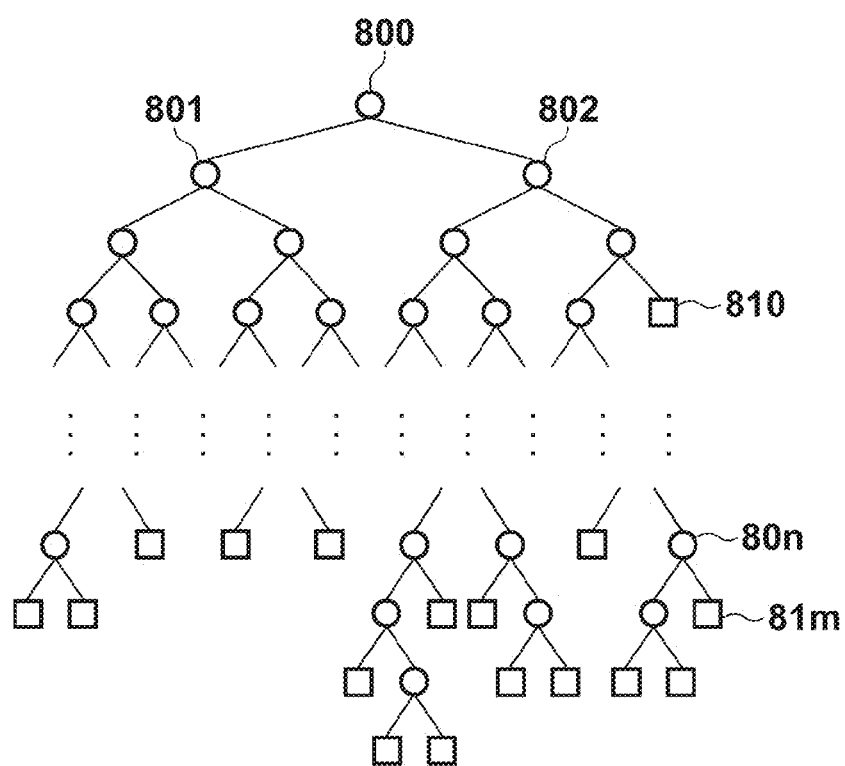

F I G. 12
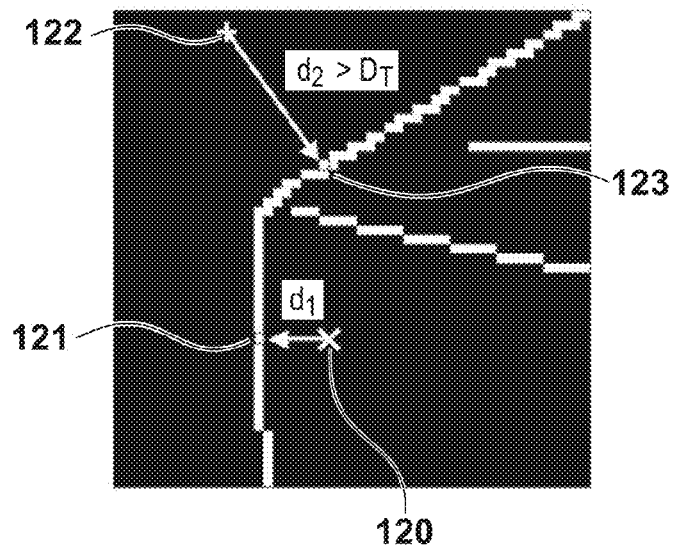
F I G. 13A
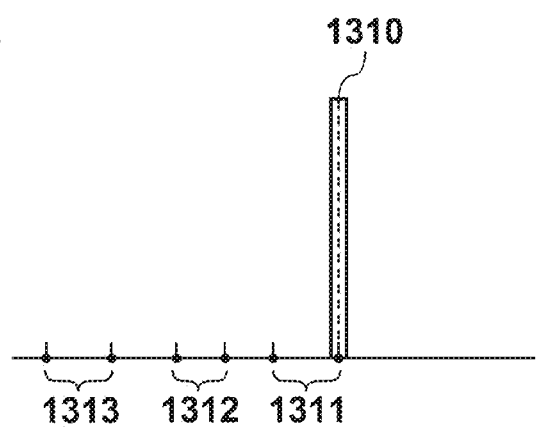
F I G. 13B
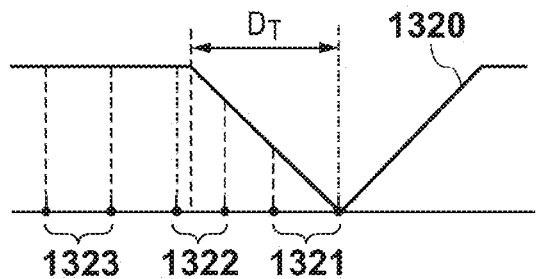

F I G. 15
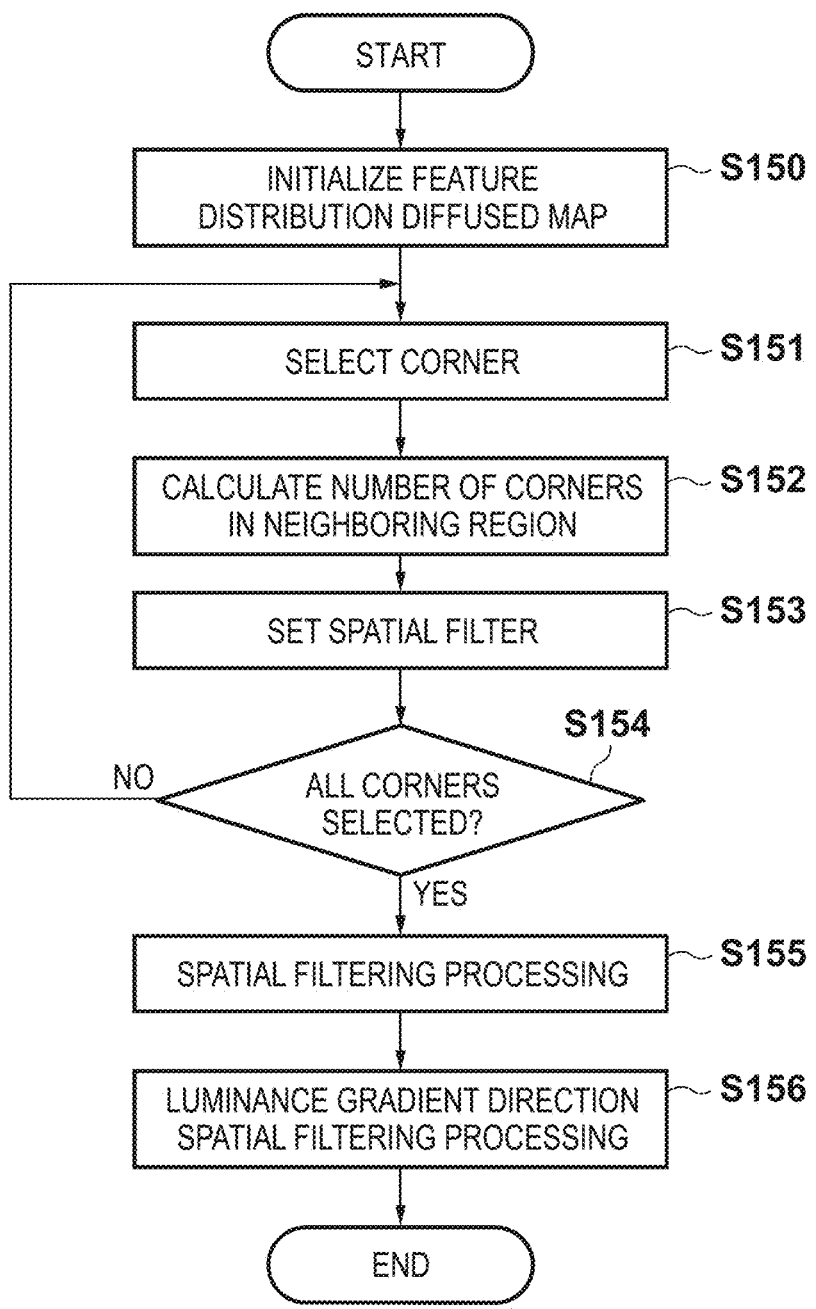

INFORMATION PROCESSING APPARATUS AND CONTROL METHOD THEREOF

This application is a division of application Ser. No. 13/218,976, filed Aug. 26, 2011 (allowed), the contents of which are incorporated by reference herein.

BACKGROUND OF THE INVENTION

Field of the Invention

The present invention relates to an information processing apparatus which executes high-speed pattern identification of information, and a control method thereof.

Description of the Related Art

As a high-speed pattern identification method, various methods have been proposed so far. For example, in association with a target object discrimination method, Japanese Patent Laid-Open No. 2009-26326 has proposed a method of discriminating based on a feature amount based on the difference between pixel luminance values at two positions whether or not an input grayscale image is a target object. This method can attain high-speed pattern identification since it uses a high-speed weak classifier using sampling data in the input grayscale data, that is, pixel luminance values at two positions. However, with this method, the difference between the pixel luminance values at the two positions used as the feature amounts is robust against bias variations of luminance values, but it is not robust against, for example, contrast variations caused by shading.

In association with pattern identification which is robust against such contrast variations, for example, Japanese Patent Laid-Open No. 2009-43184 has proposed a method which attains pattern identification using an edge image generated by applying edge extraction to input grayscale image data. With this method, features such as edges are extracted in advance, and pattern identification processing is applied to that data, thus allowing pattern identification which is robust against various variations. However, feature amounts such as edges generally tend to form a coarse distribution. Therefore, since various pieces of combination information of sampling data have no significant differences, a sufficiently high pattern identification performance cannot be consequently obtained.

As described above, a pattern identification method, which is robust against, for example, contrast variations caused by shading in image data, and allows high-speed processing, is demanded.

The present invention provides, in consideration of the above situation, an information processing apparatus which identifies a specific pattern at high speed using sampling data in image data, and attains high-speed identification which is robust against various variations.

SUMMARY OF THE INVENTION

According to one aspect of the present invention, there is provided an information processing apparatus comprising: a registration unit adapted to register information required to determine at least one specific pattern in an image; an input unit adapted to input image data; a first generation unit adapted to extract a predetermined feature distribution from the input image data, and to generate a first feature distribution map indicating the feature distribution; a second generation unit adapted to generate a second feature distribution map by applying a conversion required to relax localities of the first feature distribution map to the first feature distribution map; and a determination unit adapted to determine, using sampling data on the second feature distribution map and the registered information, which of the specific patterns the image data matches.

Further features of the present invention will be apparent from the following description of exemplary embodiments with reference to the attached drawings.

BRIEF DESCRIPTION OF THE DRAWINGS

FIG. 7 shows examples of an input image and processing results according to the second embodiment;

FIG. 8 illustrates a structure of a decision tree according to the second and third embodiments;

FIG. 12 shows a practical example of a distance map according to the second embodiment;

FIGS. 13A and 13B illustrate an edge extraction image and distance map according to the second embodiment;

FIG. 15 is a flowchart showing feature distribution diffused map generation processing according to the third embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

The first embodiment will explain a pattern identification method which uses two-dimensional grayscale image data of 20×20 pixels as input data, and identifies whether or not the image data is an image of a specific category. The specific category includes, for example, a human face category and a category of a part having a certain defect. This embodiment will explain a case in which a specific pattern in which a portion near the center of a human face is located nearly at the center of an input image (to be referred to as a "face pattern" hereinafter) is used as the specific category.

Figure 1:
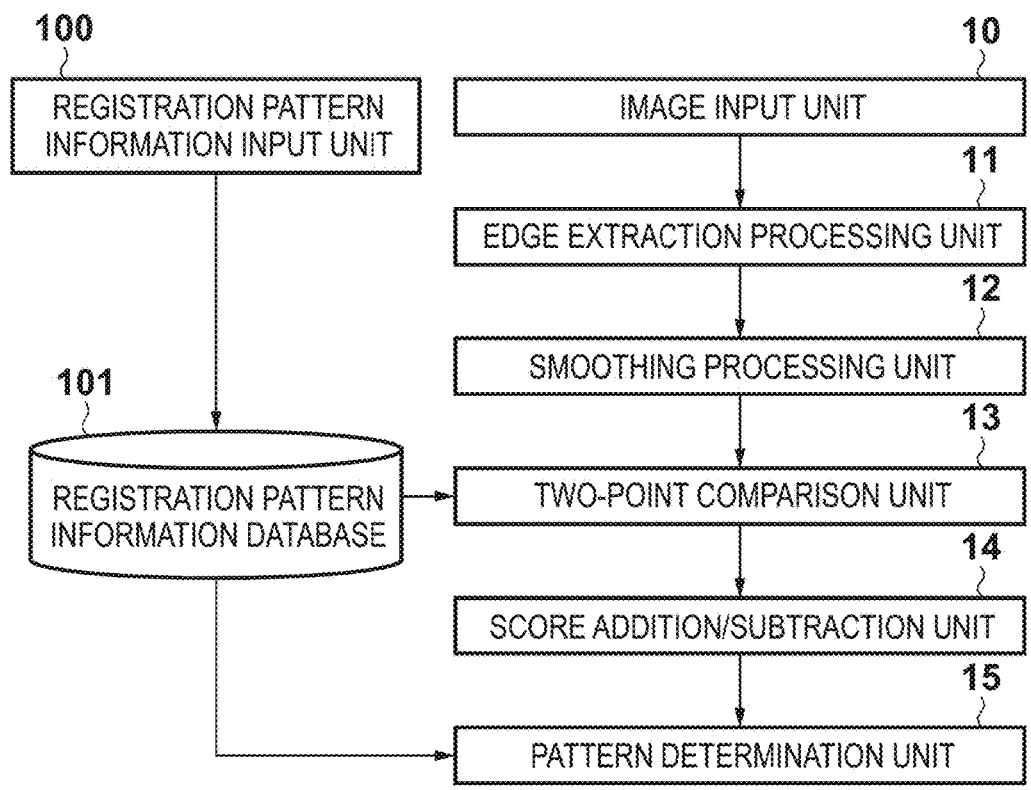
FIG. 1 is a block diagram showing an arrangement associated with processing of a pattern identification method according to the first embodiment.
Figure 2:
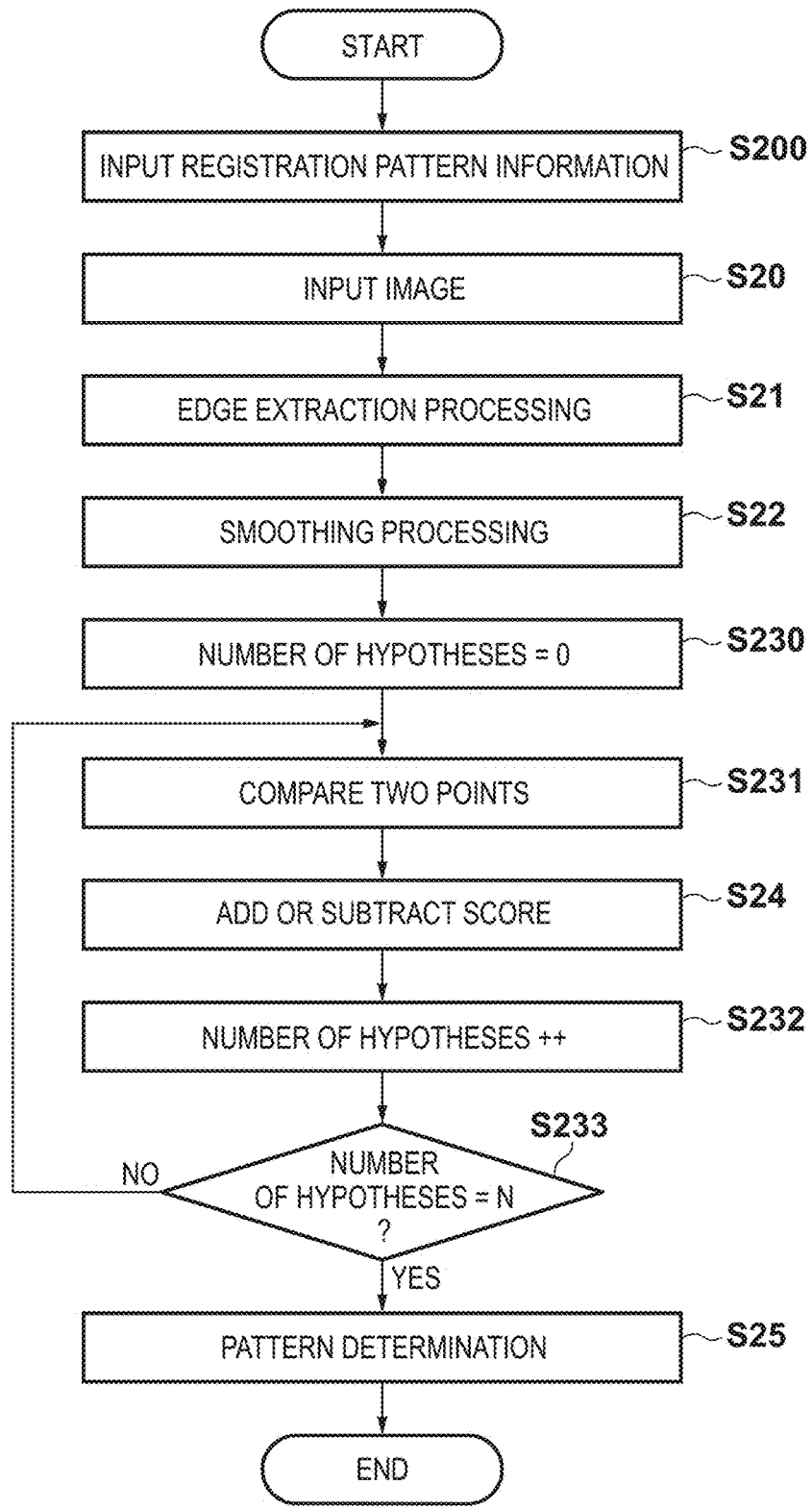
FIG. 2 is a flowchart showing the processing of the pattern identification method according to the first embodiment.

FIG. 1 shows the functional arrangement of an information processing apparatus which identifies a specific pattern according to the first embodiment. FIG. 2 shows the processing sequence of a specific pattern identification method according to the first embodiment. Functions shown in FIG. 1 may be implemented when, for example, a computer executes programs stored in a memory, in addition to hardware implementation. An example of the information processing apparatus which attains pattern identification will be described below with reference to FIGS. 1 and 2.

Referring to FIG. 1, a registration pattern information input unit 100 inputs information associated with a specific category, that is, a face pattern. A registration pattern information database 101 records and holds the information associated with the face pattern. In this embodiment, each weak classifier discriminates whether or not a difference value between pixel luminance values at two positions as feature amounts is equal to or larger than a predetermined threshold, and final pattern identification is implemented by integrating discrimination results of weak classifiers. Thus, the registration pattern information input unit 100 inputs a plurality of sets of information as those for weak classifiers, and records and holds them in the registration pattern information database 101. Each set of information includes:

(1) pieces of position information of two points between which a difference is to be calculated;

(2) a threshold for the difference at that time; and (3) a score associated with a discrimination result of each weak classifier.

The registration pattern information input unit 100 also inputs an accumulated score threshold used to finally determine whether or not an input pattern is a pattern of the specific category, and records and holds it in the registration pattern information database 101. The processing in these units corresponds to "input registration pattern information" in step S200 in FIG. 2.

As a plurality of pieces of information for each weak classifier, pieces of information obtained by ensemble learning using a large number of face patterns and patterns which are not face patterns (to be referred to as "non-face patterns" hereinafter) are used. However, in the ensemble learning, two-dimensional grayscale image data intact is not used, but data obtained by applying edge extraction processing and smoothing processing (to be described later) to the two-dimensional grayscale image is used. In this embodiment, an AdaBoost method is used as the ensemble learning method. However, the present invention is not limited to this specific method. For example, other methods such as Real AdaBoost may be used.

The accumulated score threshold required to finally determine whether or not an input pattern is a pattern of the specific category generally uses "0" in case of AdaBoost. However, when, for example, an incorrect detection, that is, a detection of a non-face pattern as a face pattern is to be suppressed, a relatively high accumulated score may be set. In this way, the accumulated score can be appropriately set according to a required performance.

Figure 3:
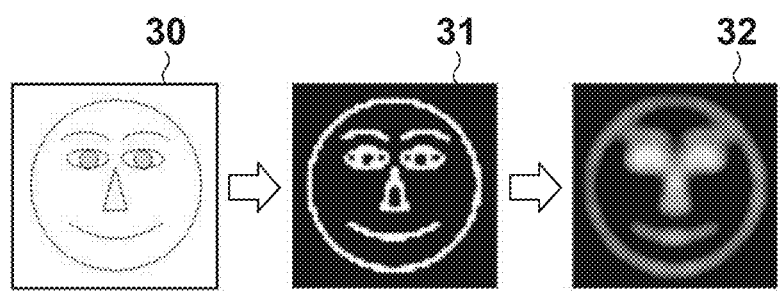
FIG. 3 shows examples of an input image and processing results according to the first embodiment.

An image input unit 10 inputs a grayscale image of 20×20 pixels (to be referred to as an "input image" hereinafter) used to identify whether or not that image matches the specific category, that is, the face pattern. More specifically, a face pattern 30 of a grayscale image shown in FIG. 3 is input. The processing in this unit corresponds to "input image" in step S20 in FIG. 2.

An edge extraction processing unit 11 generates an edge extraction image by applying edge extraction processing to the input image input by the image input unit 10 (first generation). As an example of this edge extraction processing, a Laplacian of Gaussian (LoG) filter is used. More specifically, noise removal using a Gaussian filter is applied to the input image, and a Laplacian filter is applied to the image which has undergone the noise removal. A filter obtained by compositing the Gaussian filter and Laplacian filter may be used. In general edge extraction using the LoG filter, zero crossing points after application of the LoG filter are extracted as edges. However, in this embodiment, output values of the LoG filter, which are equal to or larger than a predetermined threshold, are simply extracted as edges.

More specifically, the following processing is executed for the image obtained after application of the LoG filter. That is, a pixel value of each pixel of that image is compared with a predetermined threshold. When the pixel value is smaller than the threshold, the pixel value at that position is changed to "0". Note that this embodiment uses "0" as the predetermined threshold used in this processing.

A face pattern 31 in FIG. 3 (first feature distribution map) is an application example of this edge extraction processing to the image 30 shown in FIG. 3. When the LoG filter is applied to a general image, roughly more than half output values tend to assume values equal to or smaller than "0". For this reason, with the processing in this unit, an edge extraction image in which pixel values assume "0" at a large number of positions on the image (on the first feature distribution map) other than edge positions is obtained, as indicated by the face pattern 31 in FIG. 3. The processing in this unit corresponds to "edge extraction processing" in step S21 in FIG. 2. This embodiment executes the aforementioned edge extraction using the LoG filter, but the present invention is not limited to this. For example, edge extraction using a Sobel filter may be executed.

A smoothing processing unit 12 applies smoothing processing using a Gaussian filter to the edge extraction image generated by the edge extraction processing unit 11, thereby generating an edge distribution diffused image, that is, an edge image (second feature distribution map) in which degrees of locality of edge features are relaxed (second generation). In this smoothing processing using the Gaussian filter, a Gaussian filter which has a larger smoothing width than the general Gaussian filter for noise removal in the aforementioned LoG filter is applied. Normally, for the purpose of noise removal of an image of about 20×20 pixels, it is common practice to apply a Gaussian filter having, for example, a filter size of 3×3 pixels, and $\sigma=0.5$. By contrast, this embodiment executes the smoothing processing using a Gaussian filter which has a filter size of 7×7 pixels and $\sigma=1.5$, that is, which has a width roughly three times the aforementioned Gaussian filter. The processing in this unit corresponds to the "smoothing processing" in step S22 in FIG. 2.

A face pattern 32 (second feature distribution map) in FIG. 3 is an image obtained by applying the smoothing processing to the edge extraction image indicated by the face pattern 31. As shown in this example, this smoothing processing executes smoothing processing having a larger width than that which primarily aims at noise removal. That is, in addition to noise removal, the smoothing processing in this unit primarily aims at spatially diffusing the previously extracted edges, that is, pieces of feature information to relax localities of features.

The locality is of a nature that a feature signal, that is, a signal, which numerically expresses the presence/absence of an existence of a feature, exists in only a local range where that feature exists. A feature such as the previously extracted edge has such locality. However, as a result of the aforementioned smoothing processing, even a position where no feature signal exists may assume a signal value influenced by a feature which exists in the neighborhood of that position. Therefore, the locality of this feature information is relaxed. For this purpose, as a smoothing width, a width based on the characteristics of, for example, a standard feature distribution of the registration pattern, that is, a standard edge distribution of the face pattern, is set in place of the width required to remove noise.

More specifically, for example, when the standard feature distribution is coarse like in the example of the face pattern 31 shown in FIG. 3, a large smoothing width is set up to circumferential positions where no features exist on an original feature extraction result. For example, as shown in the example of the face pattern 32, a large smoothing width is set to diffuse the hems of feature information up to regions near the cheeks of a face on the image (on the second feature distribution map).

However, when smoothing using an excessively large width is applied, even features, which exist at spatially sufficiently distant positions, may be mixed up by the smoothing processing, and the final identification precision may consequently deteriorate. For this reason, especially according to the density of the standard feature distribution, a smoothing width is reduced so as to prevent features which exist at spatially sufficiently distant positions from being composited into a single feature. Such a smoothing width can be empirically set according to the standard feature distribution of the registration pattern and the required pattern identification precision.

More specifically, for example, when a two-point difference value is used as information of each weak classifier like in this embodiment, a smoothing width (a range within which a hem of diffused feature information can reach) can be searched within a range which is larger than a minimum value of a two-point distance and is smaller than a maximum value of the distance. Note that this embodiment sets a parameter (smoothing width) used in a conversion required to relax degrees of locality of features as a fixed parameter in advance. However, the parameter used in the conversion required to relax the degrees of locality of features may be dynamically set depending on data as a processing target of the pattern identification. For example, the parameter may be dynamically set according to an average inter-peak distance of edge intensities extracted from the input image as a processing target of the pattern identification. Such a method of dynamically setting the parameter will be described in the third embodiment.

As described above, in the pattern identification method of this embodiment, an edge distribution diffused image in which pieces of extracted feature information are spatially diffused is generated as in the aforementioned smoothing processing, and the pattern identification is executed using the edge distribution diffused image. Note that this embodiment executes the smoothing processing using the Gaussian filter. However, the present invention is not limited to this, and any other methods may be used as long as they spatially diffuse pieces of extracted feature information to relax the localities of features. As for smoothing processing using a spatial filter, it is desirable to execute smoothing processing using a filter in which circumferential weights are set to be smaller than a central weight. This embodiment uses an isotropic smoothing filter. However, the present invention is not limited to such a specific filter. For example, when the standard feature distribution is coarse in a vertical direction and dense in a horizontal direction, a vertically elongated Gaussian filter may be used. That is, a smoothing filter having a shape based on the standard feature distribution may be used.

The aforementioned processes in the edge extraction processing unit 11 and smoothing processing unit 12 are applied to each of a large number of face patterns and non-face patterns used in the ensemble learning, and the learning is made using the data to which these processes have been applied. In this case, it is desired that a parameter such as the smoothing width in these processes which are applied to a large number of patterns used in the learning matches that of processes to be applied in an actual pattern identification stage.

Upon completion of the generation processing of the edge distribution diffused image in the smoothing processing unit 12 shown in FIG. 1, pattern identification processing is executed using this edge distribution diffused image. A two-point comparison unit 13 in FIG. 1 compares a difference value between luminance values of pixels at two points in the edge distribution diffused image with a threshold based on the information of each weak classifier held in the registration pattern information database 101. When the difference value between the luminance values of the pixels at the two points is equal to or larger than the threshold, the two-point comparison unit 13 sends a score corresponding to that weak classifier to a score addition/subtraction unit 14. The score addition/subtraction unit 14 adds that score to an accumulated score. Conversely, when the difference value of the two points is equal to or smaller than the threshold, the two-point comparison unit 13 sends a score obtained by inverting the sign of the corresponding score to the score addition/subtraction unit 14, which adds that score to the accumulated score. This processing corresponds to a subtraction of an original score since its sign is inverted.

The processing sequence in the two-point comparison unit 13 and score addition/subtraction unit 14 will be described below with reference to FIG. 2. In step S230, the two-point comparison unit 13 initializes the number of hypotheses to "0", and also the accumulated score to "0". Next, in step S231, the two-point comparison unit 13 selects a plurality of pieces of information of a weak classifier in turn from those of a plurality of weak classifiers held in the registration pattern information database 101 (the selection order can be arbitrarily set, but redundant selection is avoided). Then, the two-point comparison unit 13 compares a difference value between luminance values of pixels at positions of predetermined two points of sampling points, which are set in advance, of the edge distribution diffused image, with the threshold based on the selected information of the weak classifier.

Subsequently, in step S24, based on the comparison result in step S231, the score addition/subtraction unit 14 adds the corresponding score to the accumulated score when the difference value is equal to or larger than the threshold, or subtracts the corresponding score from the accumulated score when the difference value is equal to or smaller than the threshold. Furthermore, in step S232, the score addition/ subtraction unit 14 increments the number of hypotheses by "1".

Then, the score addition/subtraction unit 14 determines in step S233 whether or not the number of hypotheses reaches the total number (N) of weak classifiers held in the registration pattern information database 101. If the number of hypotheses reaches the total number N, the process advances to step S25. If the number of hypotheses does not reach the total number N, the process returns to step S231 to select information of a new weak classifier from the registration pattern information database 101, thus repeating the aforementioned processes.

That is, the processes in steps S231, S24, and S232 are repeated as many times as the total number of weak classifiers held in the registration pattern information database 101. Then, the process advances to the next pattern determination step S25. The processing sequence in the two-point comparison unit 13 and score addition/subtraction unit 14 has been described.

Finally, a pattern determination unit 15 determines whether or not the accumulated score added and subtracted by the score addition/subtraction unit 14 is equal to or larger than the accumulated score threshold held in the registration pattern information database 101. Then, when the accumulated score is equal to or larger than the accumulated score threshold, the pattern determination unit 15 determines that the image input by the image input unit 10 matches a pattern of the specific category, that is, a face pattern in this embodiment. When the accumulated score is equal to or smaller than the threshold, the pattern determination unit 15 determines a non-face pattern. The processing in this unit corresponds to "pattern determination" in step S25 in FIG. 2. Upon completion of the processing in this step, the processing of the pattern identification method of this embodiment ends.

As described above, in the pattern identification method of this embodiment, features, which exist on input data, are extracted, and data is generated by relaxing the localities of pieces of feature information. To this data, identification processing of a pattern is applied using the classifiers required to implement identification using sampling data in the data. These classifiers include data which have been learned using a large number of data that have undergone similar feature extraction processing and feature information diffusion processing. By executing the identification processing of sampling data using these classifiers, high-speed pattern identification which is robust against various data variations can be implemented. In this case, three effects obtained by the processing for diffusing pieces of feature information to relax the localities of features, which is a most characteristic feature in the pattern identification method of this embodiment, will be described below. The first effect is a noise removal (suppression in practice) effect, which is the same as an effect of general smoothing processing. Such noise removal can generally enhance an identification performance in pattern identification. This effect is a general effect obtained upon application of smoothing processing. The second effect is an effect of improving robustness against variations of, for example, extracted feature positions, which is the same as an effect of pooling processing in a feature combined layer. As a result of improvement of the robustness against variations of, for example, extracted feature positions, improvement of a generalization performance in the pattern identification can be expected. This effect is also a general effect upon application of the smoothing processing.

Figure 4A:
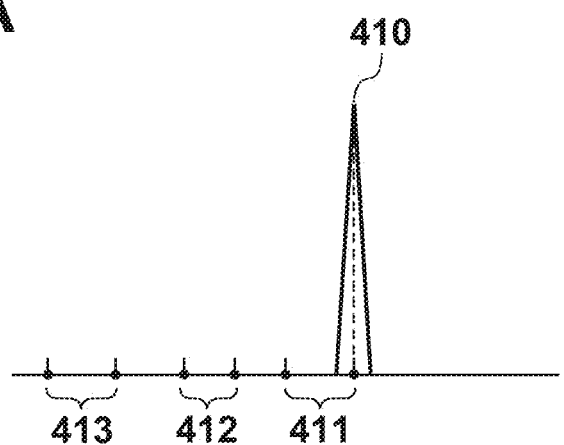
FIGS. 4A and 4B illustrate an edge extraction image and edge distribution diffused image according to the first embodiment.
Figure 4B:
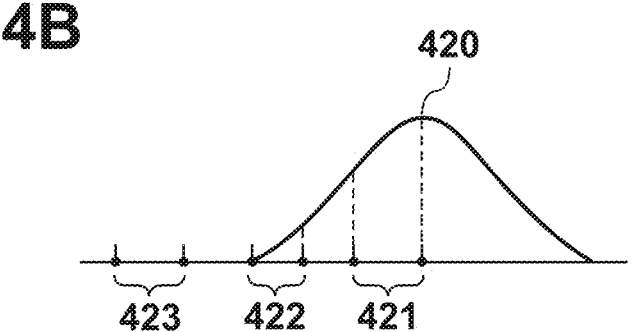

The third and final effect is a characteristic effect in the pattern identification method of this embodiment, and this effect will be described below with reference to FIGS. 4A and 4B. The abscissa in FIGS. 4A and 4B plots a position, and the ordinate plots a degree of feature distribution. As described above, edges extracted as features in this embodiment are effective to improve the robustness against various variations, but such features tend to generally have a coarse distribution, that is, high localities. FIG. 4A illustrates this tendency. This embodiment has exemplified the processing for two-dimensional data. However, FIG. 4A exemplifies one-dimensional data for the sake of simplicity. As described above, a feature signal such as an edge, which has a coarse distribution tendency, locally exists at a position 410, as shown in FIG. 4A, and does not appear at other positions, that is, positions where no feature signal exists.

In this case, upon execution of the pattern identification method which uses sampling data for the purpose of high-speed execution of the pattern identification, that is, the method using a difference value between luminance values of pixels at two points, the following phenomenon occurs. For example, a two-point difference value, which is indicated by positions 411 in FIG. 4A, can have significant information indicating a high possibility of existence of a feature signal at the position of a right point of the positions 411.

However, two-point difference values indicated by positions 412 and 413 in FIG. 4A can have information indicating a possibility of non-existence of a feature signal at the positions of respective points, but they do not have any information which can distinguish their difference. In addition, in case of features as a coarse distribution, that is, a situation in which feature signals locally exist at limited positions, a large number of two-point combinations have no information difference like the difference values at the positions 412 and 413. For this reason, the total number of two-point combinations from which information useful in identification becomes relatively small, and as a result, a sufficiently high pattern identification performance cannot be obtained.

By contrast, as shown in FIG. 4B, when feature signals are diffused by the smoothing processing like a position 420 to relax the localities of features, two-point difference values at positions 422 and 423, which correspond to the positions 412 and 413, have a difference. As shown in this example, when the localities of features are relaxed, a large number of two-point combinations have various variations of information compared to a case in which the localities of features are not relaxed. For this reason, the total number of two-point combinations from which information useful in identification can be obtained becomes relatively large, and as a result, a pattern identification performance is more likely to be improved.

More specifically, a two-point difference value at the positions 423 assumes "0" in the same manner as in the case in which a feature signal is not diffused. However, as a result of diffusion of feature signals, a two-point difference value at the positions 412 assumes "0", while a two-point difference value at the corresponding positions 422 assumes a nonzero value according to a distance from a pixel position of a peak 420. In this way, the number of other two-point combinations which assume a difference value=0 like the positions 423 is reduced, and as a result, information indicating that the two-point difference value at the positions 423 is "0" becomes unique information, thus increasing an information volume.

From a qualitative viewpoint, such information can be that indicating a high possibility of non-existence of a feature in the neighborhood of two points at the positions 423. Also, for example, a two-point difference value at the positions 422 can be information indicating that a feature exists at the position of a right point of the two points, or a feature exists in a direction of the right point. In this manner, the two-point difference value at the positions 422 additionally has information indicating a possibility of existence of a feature on the right side, compared to the two-point difference value at the positions 412.

In this embodiment, the pattern determination processing is executed in the pattern determination step S25 in FIG. 2 based on a score obtained by adding/subtracting, in the score addition/subtraction step S24, a plurality of results obtained in the two-point comparison step S231. When the pattern identification is attained by integrating a plurality of pieces of information like AdaBoost used in this embodiment, a high performance tends to be attained since an information volume pertaining to each piece of individual information increases. For this reason, since information volumes of the two-point difference values at the positions 422 and 423 increase, a higher pattern identification performance is more likely to be attained.

In this way, since pieces of feature information are diffused to relax the localities of features, pieces of combination information of sampling data can have various variations of information, thus expecting to improve the pattern identification performance. This effect is a characteristic feature obtained by the processing for diffusing pieces of feature information to relax the localities of features in the pattern identification method of this embodiment.

Note that this embodiment has explained the method using two-point difference values as the pattern identification method using sampling data. However, the present invention is not limited to this specific method. For example, a method of comparing one arbitrary point with a threshold or a method of increasing the number of sampling data to use a difference between a sum of certain two points and that of other two points may be used. In this way, the number of sampling data used in the pattern identification can be arbitrarily set. This embodiment has exemplified the method of identifying whether or not an input pattern matches that of the specific category. However, by applying the aforementioned processing to an input image in a raster-scan manner, a pattern of the specific category can be detected from the input image.

Second Embodiment

The second embodiment will explain an example of a pattern identification method which inputs an image obtained by capturing a specific object, and identifies a direction from which the image of the specific object was captured, as another embodiment of the pattern identification method described in the first embodiment.

Figure 5:
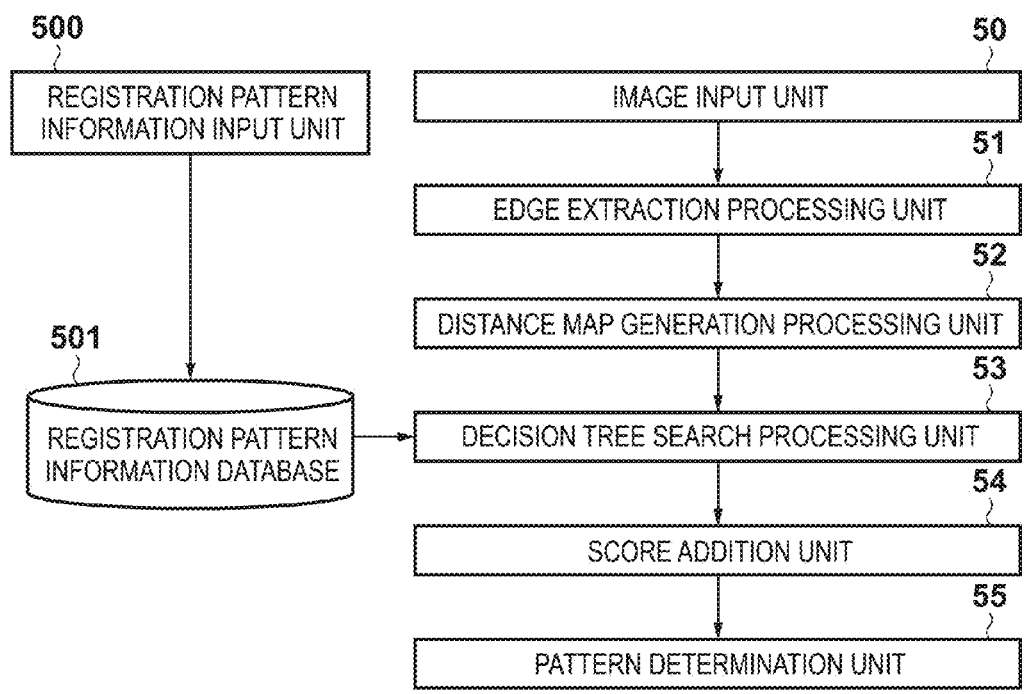
FIG. 5 is a block diagram showing an arrangement associated with processing of a pattern identification method according to the second embodiment.
Figure 6:
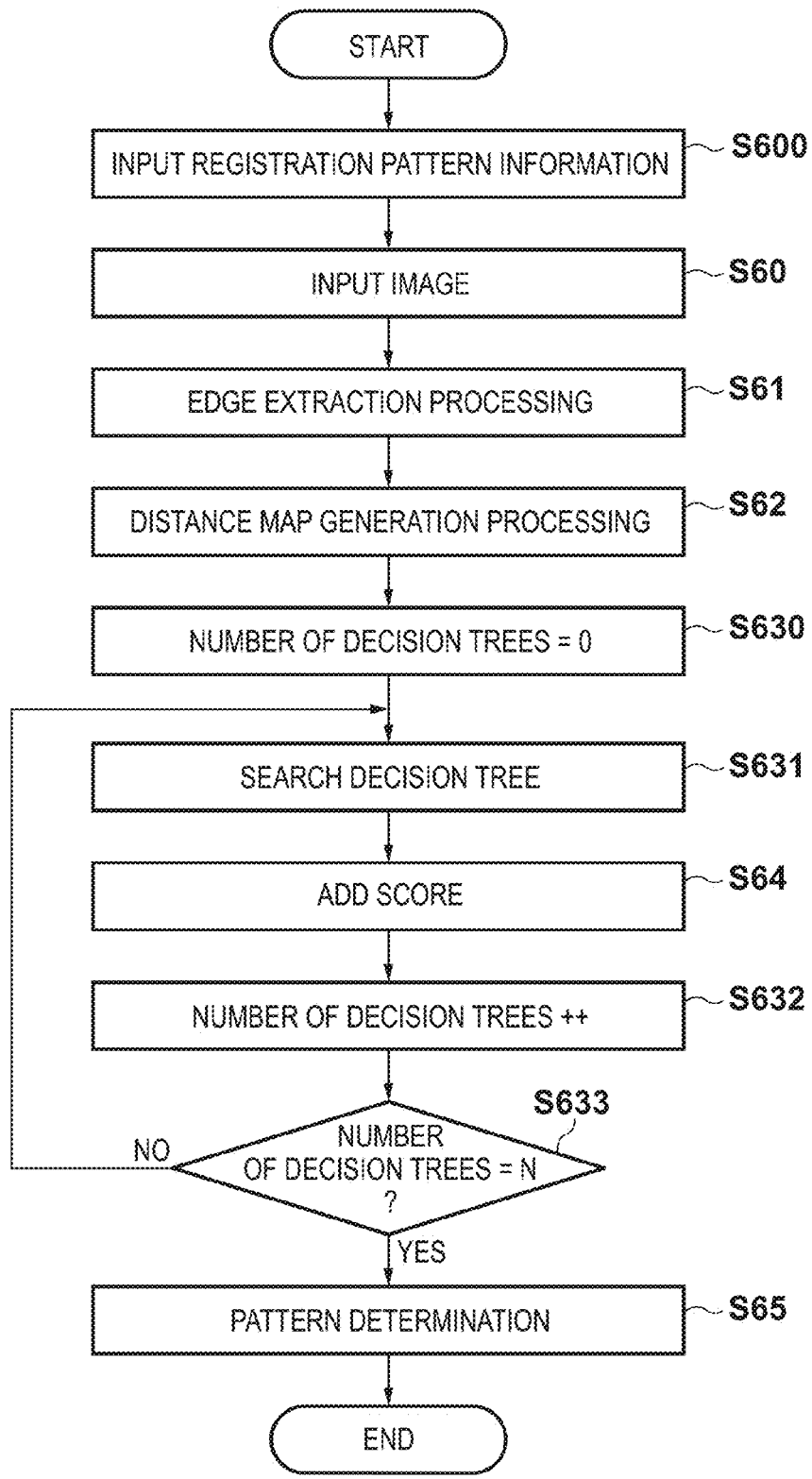
FIG. 6 is a flowchart showing the processing of the pattern identification method according to the second embodiment.

FIG. 5 is a block diagram showing the arrangement of processing of a pattern identification method according to the second embodiment. FIG. 6 shows the processing sequence of the pattern identification method according to the second embodiment. A registration pattern information input unit 500 in FIG. 5 inputs information associated with patterns which are obtained by capturing images of a specific object from various directions. A registration pattern information database 501 records and holds the information associated with the captured patterns. In this embodiment, a plurality of decision trees which branch based on comparison of two-point values are used, and final pattern identification is attained by integrating results of these trees unlike in the first embodiment. Hence, the registration pattern information input unit 500 executes processing for inputting information of the plurality of decision trees. In this embodiment, a binary tree is used as the decision tree, and information of one decision tree includes a plurality of pieces of branch node information, and a plurality of pieces of leaf information.

FIG. 8 shows the structure of the decision tree used in this embodiment. The plurality of pieces of branch node information and the plurality of pieces of leaf information included in the decision tree of this embodiment will be described below with reference to FIG. 8. In FIG. 8, branch nodes 800, 801, 802, and 80*n* are indicated by circles, and each branch node has one set of branch node information. Also, leaves 810 and 81*m* are indicated by squares, and each leaf has one set of leaf information.

The branch node information includes a position of a first point and that of a second point upon comparing luminance values at the two points, and information of branch destinations. In actual processing, the magnitude relationship between luminance values of pixels at the positions of the first and second points is calculated based on the branch node information, and which of branch destinations the control is to advance is decided according to that result.

In this embodiment, when the luminance value at the position of the first point is larger than that at the position of the second point, the control advances to a left branch destination in FIG. 8; otherwise, the control advances to a right branch destination. For example, in case of the branch node 800, the information of the branch destinations indicates that a left branch destination is the branch node 801, and a right branch destination is the branch node 802.

Hence, in the actual processing, values of two points are compared based on the information of the branch node 800, and when the value at the position of the first point is larger, the control advances in a direction of the branch node 801; otherwise, the control advances in a direction of the branch node 802. In the following description, such a process will be referred to as a search of the decision tree. In this connection, the branch node 800 is called a route node, and the search of the decision tree is always started from this route node.

The leaf information is that of a result in this decision tree, that is, an identification result indicating a direction from which the image of the specific object was captured in this embodiment. In this embodiment, pieces of information indicating directions from which images of the specific object were captured, which are originally continuous pieces of information, are quantized, and are expressed by 162 indices 1 to 162. These 162 indices correspond to respective vertex positions of a so-called geodesic dome having 162 vertices. This means that each of the vertex positions is near a position where an image of the specific object was captured under the assumption that the specific object is located at the central position of this geodesic dome. For this reason, the leaf information is simply that of one of numerical values 1 to 162. In this embodiment, one leaf has only one result. In this embodiment, each end of the decision tree is always a leaf. In actual processing, the decision tree is searched until any one of leaves is reached, and an index value as that leaf information is used as a result of that decision tree.

Information of such a decision tree is generated by learning using a large number of image data obtained by capturing images of the specific object from various directions. Since this embodiment uses a recognition method which integrates pieces of information of various types of decision trees, a plurality of different decision trees have to be generated. Hence, this embodiment generates a plurality of different decision trees using a bagging method. That is, a plurality of subsets of image data randomly sampled from a large number of image data used in learning are generated, and decision trees are generated using them. Data used in generation of the decision trees are those which have undergone edge extraction processing and distance map generation processing (to be described later) as in the first embodiment.

In this embodiment, the plurality of different decision trees are generated using the bagging method. However, the present invention is not limited to this, and any other methods may be used as long as they can generate a variety of decision trees. For example, a method of generating decision trees using the AdaBoost method as in the first embodiment, and a method of generating a variety of decision trees by randomly selecting data in respective branch nodes as in a method disclosed in Japanese Patent Laid-Open No. 2005-03676 may be used.

The registration pattern information input unit 500 executes processing for inputting the information of the aforementioned decision tree as many as the number (=N) of decision trees, and recording and holding them in the registration pattern information database 501. The processing in these units correspond to "input registration pattern information" in step S600 in FIG. 6.

An image input unit 50 inputs an image obtained by capturing that of the specific object (to be referred to as an "input image" hereinafter) as a target used to determine a direction from which that image was captured. FIG. 7 shows examples of the input image and processing results. In this embodiment, a grayscale image 70 in FIG. 7 is input. The processing in this unit corresponds to "input image" in step S60 in FIG. 6.

An edge extraction processing unit 51 in FIG. 5 is a processing unit which generates an edge extraction image from the input image as in the edge extraction processing unit 11 of the first embodiment. In this embodiment, Canny edge detection or extraction processing is executed as the edge extraction processing. The processing in this unit corresponds to "edge extraction processing" in step S61 in FIG. 6. An image 71 is an application example of this Canny edge extraction processing to the image 70 in FIG. 7. As shown in the image 71, with the Canny edge detection processing, a binary image in which positions where an edge coupled to an existence position of a strong edge exists are "1", and other positions are "0" is obtained as the edge extraction image. As described above, the edge extraction processing of this embodiment generates the edge extraction image having a distribution in which extracted features have high localities, that is, feature extraction results of edges are coarse, as in the edge extraction processing of the first embodiment.

Next, a distance map generation processing unit 52 generates a distance map based on the edge extraction image generated by the edge extraction processing unit 51. The processing in this unit is that required to generate data in which the localities of extracted features are relaxed as in the smoothing processing using the Gaussian filter in the smoothing processing unit 12 in the first embodiment. This processing corresponds to "distance map generation processing" in step S62 in FIG. 6. The distance map is a map having distances to nearest-neighbor features as values of respective positions. More specifically, in this map, a feature of an edge which exists at the nearest position is searched at each position on the image, and a distance to the found nearest-neighbor feature is set as a value of that position.

FIG. 12 shows a practical example of the distance map. For example, at a position 120 shown in FIG. 12, an edge located at a position 121 is a nearest feature. If a distance from the position 120 to the position 121 is d1, a distance map value of a position corresponding to the position 120 is d1. Note that such a normal distance map may be used. However, in this embodiment, an upper limit value is set in advance for values of the distance map, and the map is generated in such a manner that when a distance to a nearest-neighbor feature is equal to or larger than this upper limit value, the upper limit value is set as a value at that position.

For example, in case of a position 122 shown in FIG. 12, an edge located at a position 123 is a nearest feature, and when a distance from the position 122 to the position 123 is d2, and d2 is larger than a predetermined upper limit value DT, the constant value DT is set as a value of the distance map at a position corresponding to the position 122. With the processing using such an upper limit value, a value of a position, which is separated from a feature existence position by a distance equal to or larger than the set upper limit value, can be suppressed to a constant value.

FIGS. 13A and 13B illustrate an edge extraction image and corresponding distance map. For the sake of simplicity, FIGS. 13A and 13B exemplify one-dimensional data. As shown in FIG. 13A, the edge extraction image has a rod-like characteristic 1310, and an edge is extracted. As shown in FIG. 13B, the distance map generated in this case indicates that a value at the position of a characteristic 1320 corresponding to that of the characteristic 1310 in FIG. 13A at which the edge is extracted assumes "0". The characteristic 1320 assumes a larger value in proportion to the distance with increasing distance from that "0" position, and then assumes a constant value $D_T$ from a position at which a distance=$D_T$. Then, as shown in FIGS. 13A and 13B, pieces of information of two-point combinations at positions 1322 and 1323 corresponding to positions 1312 and 1313, that is, the magnitude relationships between luminance values of pixels at the two-point positions in this embodiment have a difference.

As a quantitative information difference, the two-point combination at the positions 1322 has information indicating that a feature is more likely to exist in a direction of the right point of the two points. Also, the two-point combination at the positions 1323 has information indicating that no feature is more likely to exist in the vicinity of the two points at the positions 1323, thus generating a difference.

When the aforementioned upper limit value is not set in the information of the magnitude relationship between luminance values at two points used in this embodiment, pieces of information of the two-point combinations at the positions 1322 and 1323 have no difference unless there is an influence of a feature which exists at a position other than that corresponding to the position 1310. However, in practice, since there are influences of features which exist at various positions, if no upper limit value is set, pieces of information often have differences. That is, when no upper limit value is set, information indicating that no feature is more likely to exist in the vicinity of the two points at the positions 1323 cannot be obtained from the two-point combination at the positions 1323.

In this way, as a result of the processing which is set with the upper limit value in advance, information indicating that no feature is more likely to exist in the vicinity of given positions can be obtained. This upper limit value can be set based on, for example, the characteristics of the standard feature distribution of a registration pattern as in the first embodiment. More specifically, for example, the upper limit value can be set to have a value ½ of the distance between features of two points, which are considered to be sufficiently distant positions. Alternatively, this upper limit value may be set based on a distance between two points to be compared in the decision tree. In this case, the upper limit value may be set to be an intermediate value between minimum and maximum values of a distance between two points to be compared in the decision tree.

Note that as in the first embodiment, a parameter used in the conversion required to relax degrees of locality of features, that is, the upper limit value of the distance map is set in advance as a fixed parameter. Alternatively, this parameter may be dynamically set depending on data as a processing target of the pattern identification. For example, the parameter can be dynamically set according to the total number of points extracted as edges from an input image as a processing target of the pattern identification.

As this upper limit value, the same value need not always be used at all positions. For example, the upper limit values may be set according to local distribution characteristics at respective positions in the edge extraction image generated by the edge extraction processing unit 51. More specifically, a density of the edge extraction image within a region in the vicinity of an arbitrary position, for example, a region having a radius of r pixels, is calculated. When the density is high, a relatively small upper limit value may be set at that position; otherwise, a relatively large upper limit value may be set. In this way, individual upper limit values can be set at respective positions.

An image 72 in FIG. 7 is an example of a distance map generated based on the edge extraction image 71. As shown in this example, in the distance map generated in this case, a position where an edge is extracted in the edge extraction image, for example, a white (a value=1) position in the image 71 is expressed by black (a value=0) and assumes a value which becomes higher with increasing distance from the edge position. At a position which is separated from the nearest edge by a distance equal to or larger than the upper limit value, a constant value (upper limit value) is set.

In this manner, the distance map generated by this processing is data which have various variations of values even at positions where no feature exists and in which the localities of features are relaxed compared to the source edge extraction image as in the edge distribution diffused image in the first embodiment. For this reason, the same characteristic effects as those described in the first embodiment can be obtained. Note that this embodiment uses a normal Euclidean distance as a distance measure upon generation of the distance map. However, the present invention is not limited to this. For example, a distance measure such as a Manhattan distance may be used. Also, this embodiment generates the distance map based on distances to nearest-neighbor features. Alternatively, for example, the distance map may be generated based on an average value of distances to a plurality of features which exist at neighboring positions.

As in the first embodiment, the processes in the edge extraction processing unit 51 and distance map generation processing unit 52 are respectively applied to a large number of images used in generation of the decision trees, and the decision trees are generated using data after application of these processes. In this case, as in the first embodiment, it is desired that the parameter of these processes applied to a large number of images used in generation of the decision trees, for example, the upper limit value setting, matches that of processes to be applied in an actual pattern identification stage.

Upon completion of the generation processing of the distance map in the distance map generation processing unit 52 in FIG. 5, pattern identification processing is executed using this distance map. A decision tree search processing unit 53 in FIG. 5 searches the plurality of decision trees held in the registration pattern information database 501 to calculate one identification result per decision tree, that is, one of indices 1 to 162, and sends the identification result to a score addition unit 54. The score addition unit 54 in FIG. 5 adds "1" to an accumulated score of an index corresponding to the result sent from the decision tree search processing unit 53.

The processing sequence in the decision tree search processing unit 53 and score addition unit 54 will be described below with reference to FIG. 6. In step S630, the decision tree search processing unit 53 initializes the number of decision trees to "0", and also all elements of an accumulated score to "0". In this case, the accumulated score in this embodiment is a table having 162 elements, and respective elements correspond to the aforementioned indices 1 to 162 as identification results.

In step S631, the decision tree search processing unit 53 selects information of one decision tree in turn from those of the plurality of decision trees held in the registration pattern information database 501 (the selection order can be arbitrarily set, but redundant selection is avoided). Then, the decision tree search processing unit 53 compares luminance values of pixels at two points on the distance map based on the information of the selected decision tree to search the decision tree until one leaf is reached, thus obtaining one index as an identification result.

In step S64, the score addition unit 54 adds "1" to an element of the accumulated score corresponding to that index based on the result in step S631. For example, if an index as an identification result is k, the score addition unit 54 executes processing for adding "1" to the k-th element of the accumulated score as the table. After that, the score addition unit 54 increments the number of decision trees by "1" in step S632.

Then, the score addition unit 54 determines in step S633 whether or not the number of decision trees reaches the total number (N) of decision trees held in the registration pattern information database 501. If the number of decision trees reaches the total number N, the process advances to the next pattern determination step S65. If the number of decision trees does not reach the total number N, the process returns to step S631 to select information of a new decision tree from the registration pattern information database 501, thus repeating the aforementioned processes. The processing sequence in the decision tree search processing unit 53 and score addition unit 54 has been described.

Finally, a pattern determination unit 55 in FIG. 5 extracts an element as a maximum score from those of the accumulated score added by the score addition unit 54, and obtains an index corresponding to that element. Then, the pattern determination unit 55 determines that the image input by the image input unit 50 in FIG. 5, that is, the image obtained by capturing that of the specific object is that obtained by capturing the image of the specific object from a direction corresponding to the obtained index. The processing in this unit corresponds to "pattern determination" in step S65 in FIG. 6. Upon completion of this processing, the processing of the pattern identification method of this embodiment ends.

As described above, in the pattern identification method of this embodiment, features, which exist on input data, are extracted, and a distance map in which the localities of the extracted features are relaxed is generated by the distance map generation processing. Then, a plurality of decision trees in which branch processing is executed at respective branch nodes using sampling data in this distance map are used, and their results are integrated, thus implementing the pattern identification processing. In this manner, high-speed pattern identification, which is robust against various variations of input data, can be attained.

Note that this embodiment has explained the method using two-point comparison results as the pattern identification method using sampling data. As in the first embodiment, the present invention is not limited to this. For example, a method of executing branch processing based on a comparison result between a value of a certain point and a predetermined threshold in each branch node of the decision tree, and a method of executing branch processing based on a plurality of data may be used. In this embodiment as well, the number of sampling data used in the pattern identification can be arbitrarily set.

This embodiment has exemplified the method which inputs an image obtained by capturing that of a specific object, and identifies a direction from which the image of that specific object was captured. However, the arrangement of this embodiment is not limited to such specific use purpose. For example, this embodiment is applicable to a method of identifying whether or not input data matches a specific category (for example, whether or not an input image is a face pattern), as in the first embodiment. Also, this embodiment is applicable to a method of detecting a pattern of a specific category from an input image by raster-scan processing, as in the first embodiment.

Third Embodiment

The third embodiment will exemplify a pattern identification method which inputs an image obtained by capturing that of a specific object, and identifies a direction from which the image of that specific object was captured, as in the second embodiment.

Figure 9:
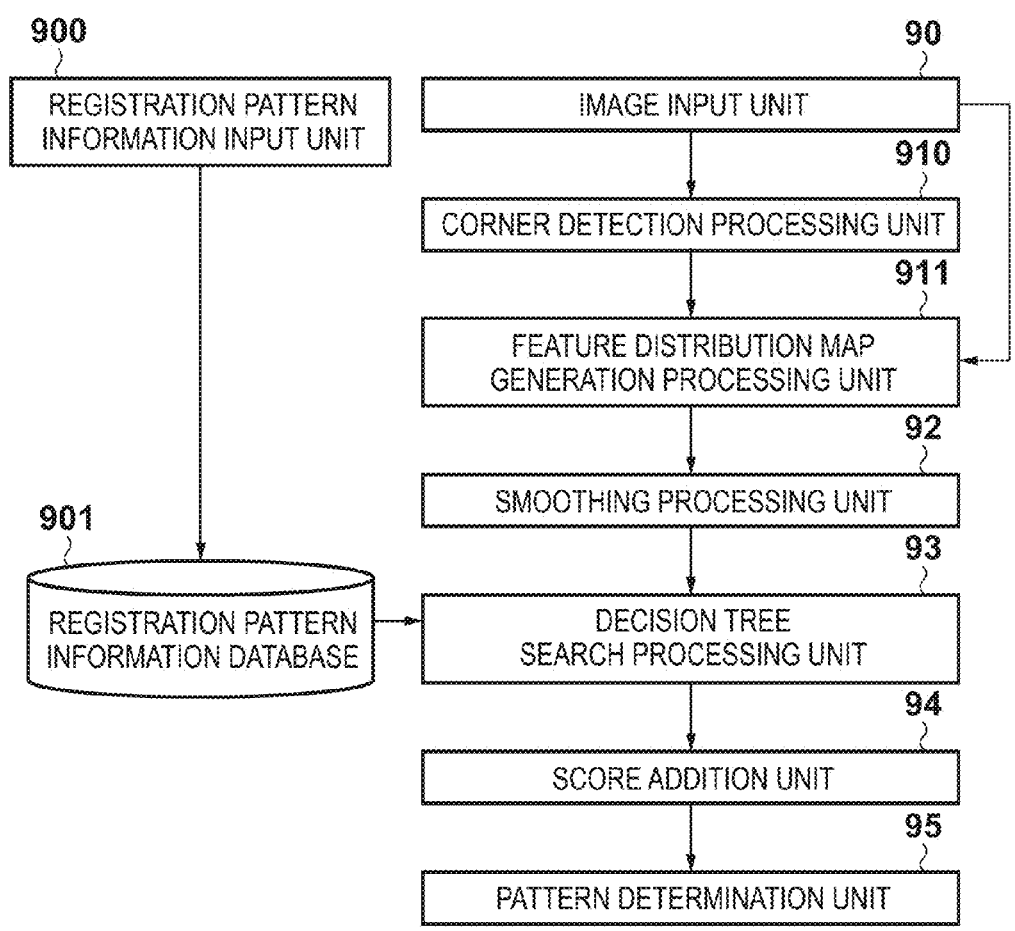
FIG. 9 is a block diagram showing an arrangement associated with processing of a pattern identification method according to the third embodiment.
Figure 10:
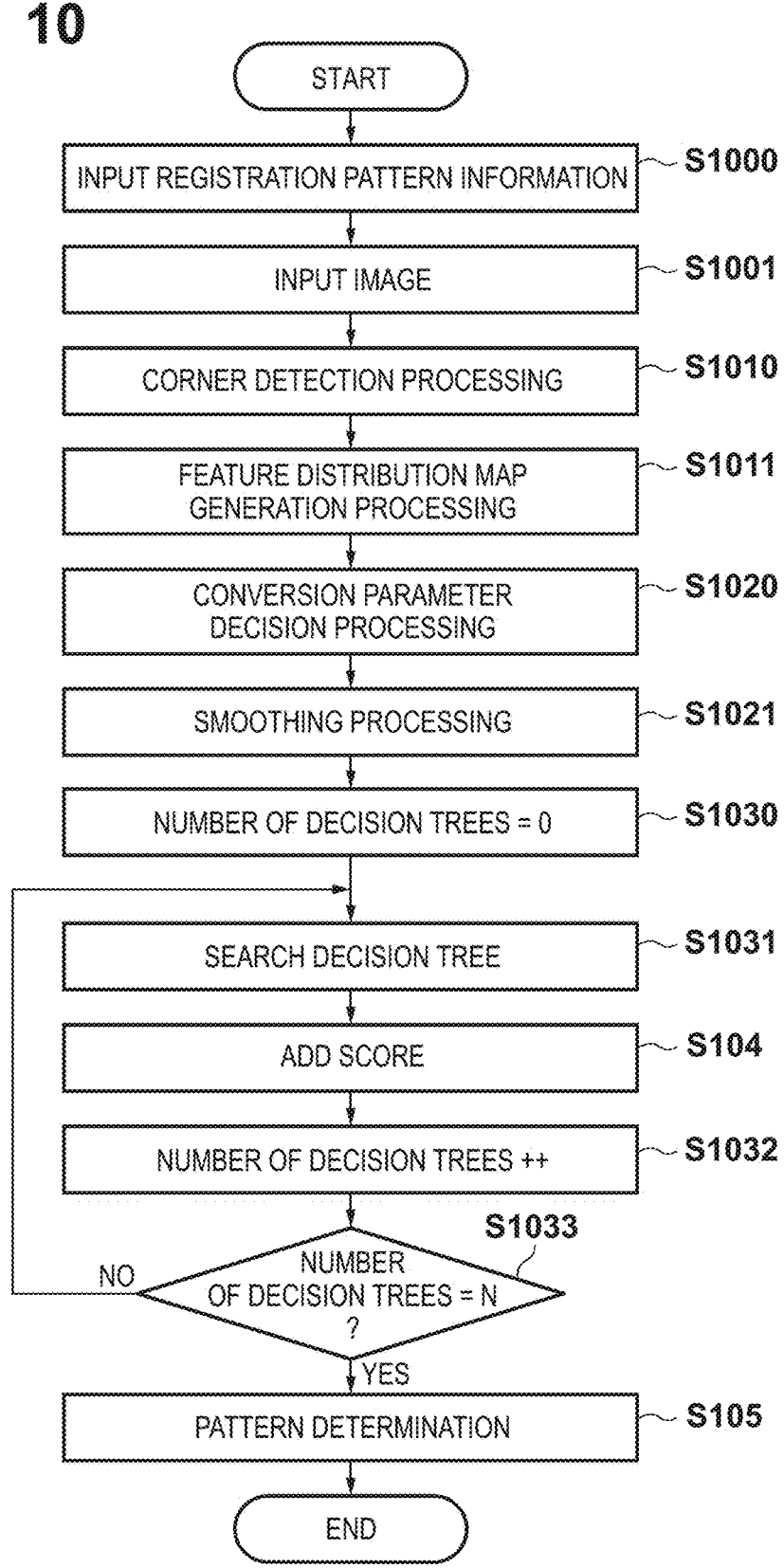
FIG. 10 is a flowchart showing the processing of the pattern identification method according to the third embodiment.

FIG. 9 shows the functional arrangement of a pattern identification apparatus according to the third embodiment. FIG. 10 shows the processing sequence of a pattern identification method according to this embodiment. An example of the pattern identification apparatus will be described below with reference to FIGS. 9 and 10, but a description of the same parts as those in the second embodiment will not be repeated.

A registration pattern information input unit 900 is the same as the registration pattern information input unit 500 in the second embodiment. In this case, the registration pattern information input unit 900 inputs pieces of information of a plurality of decision trees. A registration pattern information database 901 is also the same as the registration pattern information database 501, and records and holds the plurality of decision trees. The registration pattern information input unit 900 corresponds to "input registration pattern information" in step S1000 in FIG. 10.

The plurality of decision trees used in this embodiment are basically the same as those in the second embodiment, except for pieces of information of two points to be compared by a branch node. In this embodiment, a plurality of feature distribution diffused maps are generated from a single input image by processes in a feature distribution map generation processing unit 911 and smoothing processing unit 92 (to be described later). For this purpose, pieces of information of two points to be compared by a branch node of this embodiment include information indicating which of feature distribution diffused maps and which position each point corresponds to. Since the decision trees are the same as those in the second embodiment except for this difference, a description thereof will not be repeated. Also, data used in generation of a decision tree are the same as those in the second embodiment, except that data after application of corner edge extraction processing, feature distribution map generation processing, and smoothing processing are used.

Processing in an image input unit 90 in FIG. 9 corresponds to "input image" in step S1001, and is the same as that in the image input unit 50 of the second embodiment. Hence, a description thereof will not be repeated. A corner detection processing unit 910 applies corner detection processing to an input image to calculate positions of corners which exist on the input image.

Figure 11:
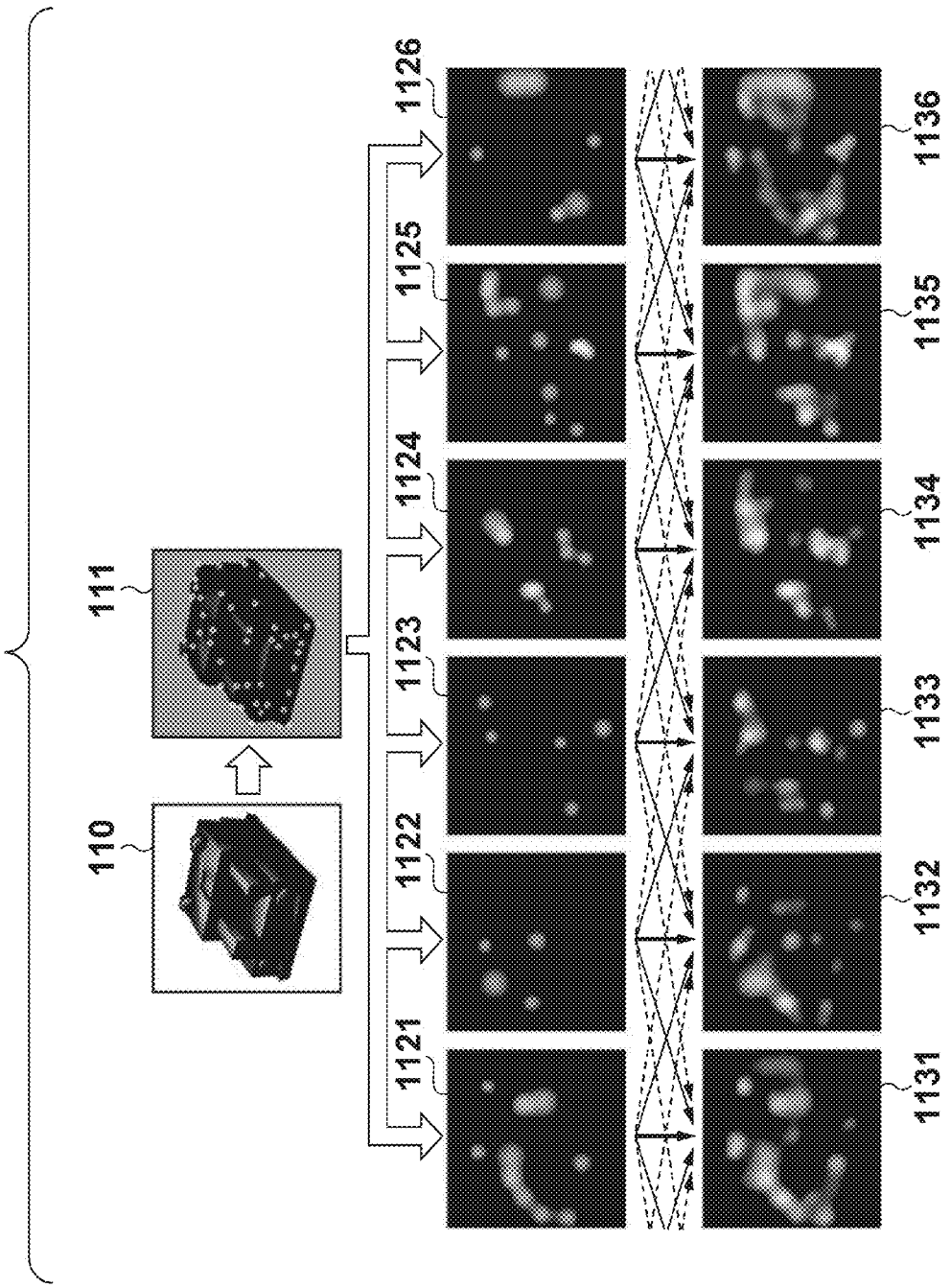
FIG. 11 shows examples of an input image and processing results according to the third embodiment.

This embodiment uses Harris corner detection processing as the corner detection processing. The processing in this unit corresponds to "corner detection processing" in step S1010 in FIG. 10. An application example of this Harris corner detection processing to an image 110 in FIG. 11 is an image 111 in FIG. 11. In the image 111 in FIG. 11, positions indicated by open circles are those detected as corners. Note that this embodiment detects corners using the Harris corner detection processing. However, the present invention is not limited to this. For example, another corner detection processing such as Moravec corner detection processing may be used.

Next, the feature distribution map generation processing unit 911 calculates luminance gradient directions at respective corner positions detected by the corner detection processing unit 910, and generates a plurality of feature distribution maps based on the calculation results. In this case, each feature distribution map corresponds to each of ranges obtained by dividing the gradation directions from 0° to 180° into a plurality of regions. In this embodiment, the gradient directions from 0° to 180° are divided into six 30° regions. Therefore, one feature distribution map exists for each of ranges from 0° to less than 30°, from 30° to less than 60°, . . . , from 150° to less than 180°.

Figure 14:
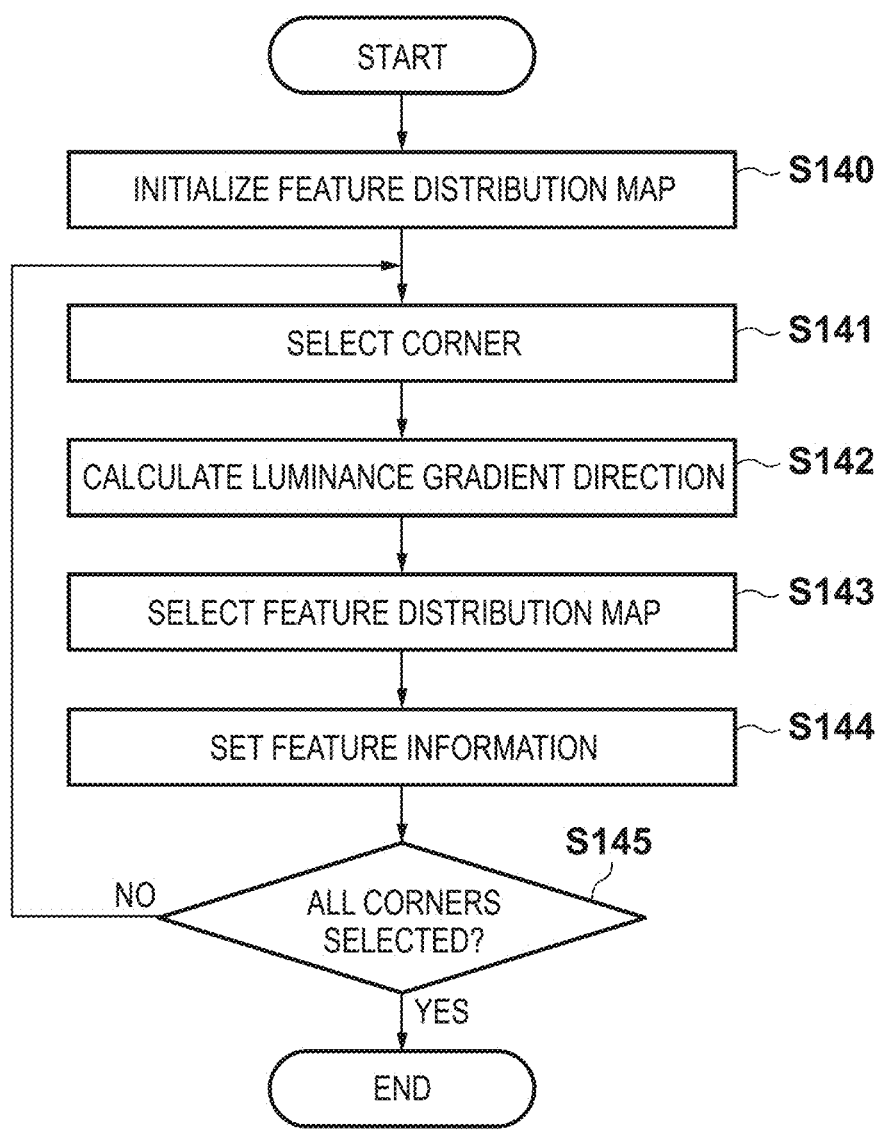
FIG. 14 is a flowchart showing feature distribution map generation processing according to the third embodiment.

FIG. 14 shows the sequence of the feature distribution map generation processing in this unit. The generation processing of a plurality of feature distribution maps in the feature distribution map generation processing unit 911 in FIG. 9 will be described below with reference to FIG. 14. In step S140, the feature distribution map generation processing unit 911 initializes values of all positions on the plurality of feature distribution maps to "0".

In step S141, the feature distribution map generation processing unit 911 selects one corner in turn from a plurality of corners detected by the corner detection processing unit 910 (the selection order can be arbitrarily set, but redundant selection is avoided). Subsequently, in step S142, the feature distribution map generation processing unit 911 calculates a luminance gradient direction of the input image at the corner position selected in step S141.

The luminance gradient direction is calculated using a Sobel filter in this embodiment. More specifically, letting Gx be a horizontal Sobel filter output at the corner position for the input image, and Gy be a vertical Sobel filter output, a gradient direction θ is given by θ=a tan(Gy/Gx) where a tan is an inverse function of a tangent function, and has a codomain from 0° to 180°.

In step S143, the feature distribution map generation processing unit 911 selects a feature distribution map corresponding to a region of those which are obtained by dividing the directions from 0° to 180° into the six regions, and to which the luminance gradient direction calculated in step S142 belongs. In step S144, the feature distribution map generation processing unit 911 sets "1" in a value of a position corresponding to the corner position selected in step S141 in the feature distribution map selected in step S143. The feature distribution map generation processing unit 911 determines in step S145 whether or not all corners detected by the corner detection processing unit 910 have been selected in step S141. If all the corners have been selected, this feature distribution map generation processing ends. If all the corners have not been selected yet, the process returns to the corner selection step S141 to select a new corner, thus repeating the aforementioned processes.

That is, by applying the processes in steps S141 to S144 to all the corners detected by the corner detection processing unit 910, this feature distribution map generation processing, that is, the generation processing of the plurality of feature distribution maps in the feature distribution map generation processing unit 911 ends. The processing in this unit corresponds to "feature distribution map generation processing" in step S1011 in FIG. 10.

Each of the plurality of feature distribution maps generated by this processing has a very coarse distribution in which only corner positions as luminance gradient directions within a range corresponding to that feature distribution map of the corners detected by the corner detection processing unit 910 are "1", and other positions are "0". More specifically, for example, the number of positions detected as corners is 46 shown in the image 111 in FIG. 11, and the number of corner positions corresponding to the luminance gradient directions from 0° to less than 30° of these corner positions is 10. As a result, the feature distribution map corresponding to the range from 0° to less than 30° has a very coarse distribution in which only 10 points in the map are "1", and other positions are "0". Therefore, these features also have high localities.

For this reason, as described above, when the pattern identification using sampling data is executed using these feature distribution maps intact, a sufficiently high identification performance cannot often be attained. Hence, in this embodiment as well, the smoothing processing unit 92 in FIG. 9 applies a conversion required to relax the localities of features to these plurality of feature distribution maps.

As described above, the smoothing processing unit 92 applies the conversion required to relax the localities of features to the plurality of feature distribution maps generated by the feature distribution map generation processing unit 911, thereby generating a plurality of feature distribution diffused maps. In this embodiment, the smoothing processing unit 92 applies two different conversions required to relax the localities of features in two stages.

FIG. 15 shows the processing sequence of the smoothing processing unit 92. In FIG. 15, spatial filtering processing in step S155 corresponds to the first conversion stage of the two conversion stages. Also, luminance gradient direction spatial filtering processing in step S156 later corresponds to the second conversion stage of the two conversion stages.

The two conversions required to relax the localities of features, which are executed by this smoothing processing unit 92, are the same as that by means of smoothing processing in the first embodiment. However, in the first conversion stage, a parameter used in the conversion is not fixed, but it is dynamically set depending on data as a processing target of the pattern identification, unlike in the parameter setting of the first embodiment. Processing for dynamically setting the parameter used in the conversion depending on processing target data corresponds to repetitive processes in steps S151 to S153 in FIG. 15. In the case of FIG. 10, this processing corresponds to the "conversion parameter decision processing" in step S1020.

Generation processing of a plurality of feature distribution diffused maps in this smoothing processing unit 92 will be described below with reference to FIG. 15. In step S150, the smoothing processing unit 92 initializes values of all positions on the plurality of feature distribution diffused maps to "0". In step S151, the smoothing processing unit 92 selects one corner in turn from the plurality of corners detected by the corner detection processing unit 910 (the selection order can be arbitrarily set, but redundant selection is avoided).

In step S152, the smoothing processing unit 92 calculates the number (=C) of corners detected in a region of a predetermined radius having the corner selected in step S151 as the center, for example, in a region of a radius of about 1/10 of the image width. Next, in step S153, the smoothing processing unit 92 sets a spatial filter used at the corner position selected in step S151 based on the number C of corners calculated in step S152 using:

$$\exp\left(-\frac{x^2+y^2}{2\sigma^2}\right), \sigma = \frac{\alpha}{\sqrt{C}} \quad (1)$$

where x and y indicate positions in the spatial filter when the center of the spatial filter is defined as an origin. Also, α is a constant associated with the width of the spatial filter. This α can be empirically set in advance to have a value that can prevent neighboring pieces of feature information from being mixed up by the spatial filtering processing in this step. In this embodiment, the value of α is set to be ¾ of the radius. Using this spatial filter, when the number of detected corners is small, that is, when C is small, the width of the spatial filter to be applied is set to be large. Conversely, when the number of detected corners is large, the width of the spatial filter is set to be small.

The smoothing processing unit 92 determines in step S154 whether or not all the corners detected by the corner detection processing unit 910 have been selected in step S151. If all the corners have been selected, the process advances to spatial filtering processing in step S155. If all the corners have not been selected yet, the process returns to the corner selection step S151 to select a new corner, thus repeating the aforementioned processes. That is, the processes in steps S151 to S153 are applied to all the corners detected by the corner detection processing unit 910, and the process then advances to the next spatial filtering processing step S155.

With the processes executed so far, for all the corners detected by the corner detection processing unit 910, spatial filters according to the numbers of corners which exist within their neighboring regions (regions of a predetermined radius) are set. As described above, in this embodiment, the parameter in the conversion required to relax the localities of features, that is, the spatial filter used in the smoothing processing of this embodiment is dynamically set depending on data as a processing target of the pattern identification.

In step S155, the smoothing processing unit 92 executes so-called projected field type spatial filtering processing using the feature distribution maps generated by the feature distribution map generation processing unit 911, thereby attaining the conversion required to relax the localities of features.

Normal receptive field type spatial filtering processing executes processing for setting a value obtained by weighting and adding a value of a corresponding position of filtering application target data by a value of a spatial filter used in the filtering processing as a value of each position after the filtering processing. By contrast, the projected field type spatial filtering processing executes the following processing. That is, a value of filtering application target data (the feature distribution map generated by the feature distribution map generation processing unit 911 in this case) is weighted by a value of a spatial filter used in the filtering processing. Then, the weighted spatial filter value is added in turn to a value of a corresponding position after the filtering processing (a value of each position of the feature distribution diffused map in this case).

Such projected field type spatial filtering processing need only be executed at a position where a signal exists (a position having a value=1 on the feature distribution map) on the filtering application target data when the filtering application target data is very coarse. Therefore, high-speed processing can be attained. More specifically, the aforementioned projected field type spatial filtering processing can be applied to only the feature distribution maps in which values are "1" at the corner positions detected by the corner detection processing unit 910 using the spatial filters set in step S153.

The spatial filter used in this projected field type spatial filtering is set according to equation (1) above according to the number of corners which exist in its neighboring region, as described above. Using such a spatial filter, when the number of detected corners is small in the neighboring region, that is, when C is small, the width of the spatial filter to be applied is set to be large. Conversely, when the number of corners is large, the width of the spatial filter is set to be small. For this reason, in a region where corners exist densely, these pieces of feature information can be diffused by a small width so as not to be mixed up with other pieces of feature information. In a region where corners exist coarsely, these pieces of feature information can be diffused by a large width.

As described above, in the pattern identification method according to the third embodiment, the conversion required to relax the localities of features may be set according to each individual position, for example, a feature distribution near that position. In this embodiment, the width of the spatial filter is changed according to a feature distribution near a position of interest. However, the present invention is not limited to this. For example, a shape of the spatial filter may be changed according to a principal axis direction of a distribution. Also, in this embodiment, the spatial filter is set according to the number of features in the vicinity of a position of interest, that is, the density of a feature distribution in a neighboring region. However, the present invention is not limited to this. For example, the spatial filter may be set based on a distance to a nearest-neighbor feature (except for itself).

FIG. 11 shows examples of the plurality of feature distribution diffused maps. Feature distribution diffused maps 1121 to 1126 are examples of those which have undergone the spatial filtering processing in step S155, that is, feature locality relaxing processing in the first stage. The feature distribution diffused map 1121 is a result obtained by relaxing the localities of features in a position space for a feature distribution map (not shown) corresponding to a luminance gradient direction range from 0° to less than 30° by the processing in step S155. Likewise, the feature distribution diffused maps 1122 to 1126 are processing results respectively corresponding to a range from 30° to less than 60° to that from 150° to less than 180°. As shown in FIG. 11, by the processing in step S155, pieces of feature information are distributed by a small width at dense corner distribution positions, and they are diffused by a large width at coarse corner distribution positions. Thus, pieces of feature information at near positions can be appropriately prevented from being mixed up, and hems of pieces of feature information, which are diffused to some extent, can reach positions where no feature exists, thus greatly relaxing the localities of features compared to original data.

However, for example, the feature distribution diffused map 1122 in FIG. 11 includes many regions where no feature signal exists, and the localities in this map are not sufficiently relaxed. Hence, as the second conversion stage required relaxing the localities of features, luminance gradient direction spatial filtering processing for also diffusing pieces of feature information in a luminance gradient direction space is executed in turn in step S156, thus also relaxing the localities of features in the luminance gradient direction space.

More specifically, by weighting the processing results in step S155 corresponding to the neighboring luminance gradient direction ranges by predetermined values, and adding the weighted results, pieces of feature information are diffused in the luminance gradient direction space. Practical processing results in this case are feature distribution diffused maps 1131 to 1136 shown in FIG. 11.

The sequence of processing for generating a result of the feature distribution diffused map 1133 corresponding to a luminance gradient direction range from 60° to less than 90° of the processing results in step S156 will be described below. The result of the feature distribution diffused map 1123 corresponding to the same luminance gradient direction range is added by weighting it by 1.0 intact (corresponding to a bold downward arrow in FIG. 11). The results of the feature distribution diffused maps 1122 and 1124 corresponding to the neighboring luminance gradient direction ranges are weighted by 0.6, and the products are added (corresponding to oblique solid arrows). Finally, the results of the feature distribution diffused maps 1121 and 1125 corresponding to luminance gradient direction ranges still distant by one range are weighted by 0.2, and the products are added, thus obtaining the feature distribution diffused map 1133 in which pieces of feature information are also diffused in the luminance gradient direction space.

In this embodiment, since 0° and 180° of luminance gradient directions match, for example, luminance gradient direction ranges which neighbor the range from 0° to less than 30° include the range from 30° to less than 60° and that from 150° to less than 180°. That is, the luminance gradient directions of the feature distribution diffused map 1131 are obtained by adding the feature distribution diffused map 1121 weighted by 1.0, the feature distribution diffused maps 1122 and 1126 weighted by 0.6, and the feature distribution diffused maps 1123 and 1125 weighted by 0.2. In this way, the conversion required to relax the localities of features in the present invention is not limited to that required to relax the localities in position spaces, but it may be a conversion required to relax the localities in other spaces.

The feature distribution diffused maps 1131 to 1136 in FIG. 11, which are generated by the processing in step S156, are examples of the plurality of feature distribution diffused maps to be generated by the smoothing processing unit 92 in FIG. 9. In this manner, the smoothing processing unit 92 executes the parameter decision processing in the conversion in the first stage, and the conversions in the first and second stages, thereby generating the plurality of feature distribution diffused maps. The processing in this unit corresponds to steps S1020 and S1021 in FIG. 10. With this processing, as shown in the feature distribution diffused maps 1131 to 1136 in FIG. 11, the localities of features can be greatly relaxed as compared to the plurality of original feature distribution maps. In this manner, the same characteristic effects as those described in the first embodiment can be obtained.

The subsequent processing units, that is, a decision tree search processing unit 93, score addition unit 94, and pattern determination unit 95 are substantially the same as those, that is, the decision tree search processing unit 53, score addition unit 54, and pattern determination unit 55 in the second embodiment, except that processing target data in the decision tree search processing unit 93 are the plurality of feature distribution diffused maps in place of the distance map, as compared to the second embodiment. Hence, a description of these units will not be given.

As described above, in the pattern identification method of this embodiment, features, which exist on input data, are extracted. Then, the aforementioned processing for diffusing pieces of feature information in the two stages of position spaces and luminance gradient direction spaces is executed, thereby generating a plurality of feature distribution diffused maps in which the localities of the extracted features are relaxed. Also, except for use of the plurality of feature distribution diffused maps, as in the second embodiment, a plurality of decision trees which execute branch processing using sampling data in the plurality of feature distribution diffused maps in respective branch nodes are used, and their results are integrated to implement the pattern identification processing. In this way, the high-speed pattern identification which is robust again various variations can be attained.

Note that this embodiment extracts a feature at a point of interest based on the result of the corner detection processing. However, the present invention is not limited to this. For example, other feature detection methods such as a method based on a blob detection result using Difference of Guassians (DoG) may be used. As in other embodiments, as the pattern identification method using sampling data, a method using a comparison result between a value of one point and a predetermined threshold may be used in addition to the method using two-point comparison results. Also, the arrangement of this embodiment is applicable to a method of identifying whether or not input data matches a specific category, and a method of detecting a pattern of a specific category from an input image by raster-scan processing.

According to the present invention, high-speed pattern identification can be attained using sampling data in data, so as to be robust against various variations.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-198262 filed on Sep. 3, 2010, which is hereby incorporated by reference herein in its entirety.

What is claimed is:

1. An information processing apparatus comprising:
a holding unit configured to hold a classified result of a plurality of learning images and a position where a pixel value is to be obtained, wherein the plurality of learning images are classified based on a pixel value obtained from a learning image that belongs to any of a plurality of categories;
an input unit configured to input an image;
a first generation unit configured to generate a first image indicating characteristic distribution of the input image;
an obtaining unit configured to obtain a parameter with regard to a conversion required to relax localities of the first image, wherein the parameter is determined in advance;
a second generation unit configured to generate a second image by applying the conversion having the determined parameter to the first image;
a selecting unit configured to select a plurality of individual pixels from the second image based on the position where the pixel value is to be obtained;
a comparing unit configured to compare a plurality of pixel values of the selected plurality of individual pixels; and
a determination unit configured to determine, for the input image, a corresponding category of the learning image based on a result of the comparing unit.

2. The apparatus according to claim 1, wherein the input image and the learning image include an object, and wherein the category is information representing which direction the object is observed from.

3. The apparatus according to claim 1, wherein the first image represents a distribution of edges included in the input image.

4. The apparatus according to claim 3, further comprising an edge extraction unit configured to extract the edges,
wherein the first generation unit generates a first image representing a distribution of the edges, based on a result of the edge extraction unit.

5. The apparatus according to claim 1, wherein the input image includes an object, and wherein the parameter is predetermined based on an image including the object.

6. The apparatus according to claim 1, wherein the input unit inputs a plurality of partial images extracted from one image, and wherein the obtaining unit, the selecting unit, the comparing unit, and the determination unit perform each processing to each of the input plurality of partial images,
the apparatus further comprising:
a second determination unit configured to determine a category of an image constituted from the partial images, based on each category determined to each of the input plurality of partial images.

7. An information processing apparatus comprising:
a holding unit configured to hold a classified result of a plurality of learning images and a position where a pixel value is to be obtained, wherein the plurality of learning images are classified based on a pixel value obtained from a learning image that belongs to any of a plurality of categories;
an input unit configured to input an image;
a first generation unit configured to generate a first image indicating characteristic distribution from the input image;

an obtaining unit configured to obtain a parameter with regard to a conversion required to relax localities of the first image, wherein the parameter is determined in advance;

a second generation unit configured to generate a second image by applying the conversion having the determined parameter to the first image;

a selecting unit configured to select a individual pixel from the second image based on the position where the pixel value is to be obtained;

a comparing unit configured to compare a pixel value of the selected individual pixel with a threshold value; and a determination unit configured to determine, for the input image, a corresponding category of the learning image based on a result of the comparing unit.

8. The apparatus according to claim 7, wherein the input image and the learning image include an object, and wherein the category is information representing which direction the object is observed from.

9. The apparatus according to claim 7, wherein the first image represents a distribution of edges included in the input image.

10. The apparatus according to claim 9, further comprising an edge extraction unit configured to extract the edges, wherein the first generation unit generates a first image representing a distribution of the edges, based on a result of the edge extraction unit.

11. The apparatus according to claim 7, wherein the input image includes an object, and wherein the parameter is predetermined based on an image including the object.

12. The apparatus according to claim 7, wherein the input unit inputs a plurality of partial images extracted from one image, and wherein the obtaining unit, the selecting unit, the comparing unit, and the determination unit perform each processing to each of the input plurality of partial images, the apparatus further comprising:

a second determination unit configured to determine a category of an image constituted from the partial images, based on each category determined to each of the input plurality of partial images.

13. A method for controlling an information processing apparatus comprising:

holding a classified result of a plurality of learning images and a position where a pixel value is to be obtained, wherein the plurality of learning images are classified based on a pixel value obtained from a learning image that belongs to any of a plurality of categories;

inputting an image;

generating a first image indicating characteristic distribution of the input image;

obtaining a parameter with regard to a conversion required to relax localities of the first image, wherein the parameter is determined in advance;

generating a second image by applying the conversion having the determined parameter to the first image;

selecting a plurality of individual pixels from the second image based on the position where the pixel value is to be obtained;

comparing a plurality of pixel values of the selected plurality of individual pixels; and determining, for the input image, a corresponding category of the learning image based on a result of the comparing.

14. A non-transitory computer readable storage medium storing a computer program which, when executed on a computer, causes the computer to execute the steps of a method for controlling an information processing apparatus comprising:

holding a classified result of a plurality of learning images and a position where a pixel value is to be obtained, wherein the plurality of learning images are classified based on a pixel value obtained from a learning image that belongs to any of a plurality of categories;

inputting an image;

generating a first image indicating characteristic distribution of the input image;

obtaining a parameter with regard to a conversion required to relax localities of the first image, wherein the parameter is determined in advance;

generating a second image by applying the conversion having the determined parameter to the first image;

selecting a plurality of individual pixels from the second image based on the position where the pixel value is to be obtained;

comparing a plurality of pixel values of the selected plurality of individual pixels; and determining, for the input image, a corresponding category of the learning image based on a result of the comparing.

15. A method for controlling an information processing apparatus comprising:

holding a classified result of a plurality of learning images and a position where a pixel value is to be obtained, wherein the plurality of learning images are classified based on a pixel value obtained from a learning image that belongs to any of a plurality of categories;

inputting an image;

generating a first image indicating characteristic distribution from the input image;

obtaining a parameter with regard to a conversion required to relax localities of the first image, wherein the parameter is determined in advance;

generating a second image by applying the conversion having the determined parameter to the first image;

selecting a individual pixel from the second image based on the position where the pixel value is to be obtained;

comparing a pixel value of the selected individual pixel with a threshold value; and determining, for the input image, a corresponding category of the learning image based on a result of the comparing.

16. A non-transitory computer readable storage medium storing a computer program which, when executed on a computer, causes the computer to execute the steps of a method for controlling an information processing apparatus comprising:

holding a classified result of a plurality of learning images and a position where a pixel value is to be obtained, wherein the plurality of learning images are classified based on a pixel value obtained from a learning image that belongs to any of a plurality of categories;

inputting an image;

generating a first image indicating characteristic distribution from the input image;

obtaining a parameter with regard to a conversion required to relax localities of the first image, wherein the parameter is determined in advance;

generating a second image by applying the conversion having the determined parameter to the first image;

selecting a individual pixel from the second image based on the position where the pixel value is to be obtained;

comparing a pixel value of the selected individual pixel with a threshold value; and determining, for the input image, a corresponding category of the learning image based on a result of the comparing.

* * * * *